(12) United States Patent
Rogers et al.

(10) Patent No.: US 8,211,620 B2
(45) Date of Patent: Jul. 3, 2012

(54) THERMOPLASTIC MATERIAL COMPRISING POLYCHROMIC SUBSTANCES

(75) Inventors: Neil John Rogers, Vilvoorde (BE); Christopher Lamb, Ohain (BE); Anthony Nicholas Jarvis, Widnes Cheshire (GB)

(73) Assignee: The Procter & Gamble Company, Cincinnati, OH (US)

( * ) Notice: Subject to any disclaimer, the term of this patent is extended or adjusted under 35 U.S.C. 154(b) by 5 days.

(21) Appl. No.: 13/006,495

(22) Filed: Jan. 14, 2011

(65) Prior Publication Data
US 2011/0109014 A1    May 12, 2011

Related U.S. Application Data

(63) Continuation of application No. 12/357,671, filed on Jan. 22, 2009, now Pat. No. 7,897,320.

(30) Foreign Application Priority Data

Jan. 25, 2008  (EP) .................................... 08150652

(51) Int. Cl.
*G03F 7/00* (2006.01)
*G03F 7/004* (2006.01)
*G03F 7/20* (2006.01)

(52) U.S. Cl. ................. 430/270.1; 430/9; 430/270.15; 430/330; 430/905; 430/944; 430/945

(58) Field of Classification Search .............. 430/270.1, 430/9, 270.15, 330, 905, 913, 944, 945
See application file for complete search history.

(56) References Cited

U.S. PATENT DOCUMENTS

| | | |
|---|---|---|
| 4,705,742 A | 11/1987 | Lewis |
| 4,734,355 A | 3/1988 | Lewis et al. |
| 4,863,832 A | 9/1989 | Saitoh et al. |
| 5,095,134 A | 3/1992 | Liu |
| 5,149,616 A | 9/1992 | Liu |
| 5,153,106 A | 10/1992 | Liu |
| 5,232,820 A | 8/1993 | Lewis et al. |
| 5,489,639 A | 2/1996 | Faber et al. |
| 7,459,259 B2 | 12/2008 | Engel et al. |

FOREIGN PATENT DOCUMENTS

| | | |
|---|---|---|
| EP | 0 061 898 B1 | 6/1985 |
| WO | WO 92/07297 A1 | 4/1992 |
| WO | WO 94/12352 A1 | 6/1994 |
| WO | WO 96/21885 A1 | 7/1996 |
| WO | WO 2006/018640 A1 | 2/2006 |
| WO | WO 2006/051309 A1 | 5/2006 |
| WO | WO 2007/063339 A2 | 6/2007 |

OTHER PUBLICATIONS

International Search Report mailed Jun. 24, 2009, 4 pages.

*Primary Examiner* — Amanda C. Walke
(74) *Attorney, Agent, or Firm* — Andrew J. Hagerty

(57) ABSTRACT

The present invention relates to thermoplastic material comprising polymer and at least one polychromic substance, wherein the polychromic substance is a functionalised diacetylene having the formula which has the general structure:

$$X-C{\equiv}C-C{\equiv}C-Y-(CO)_n-QZ$$

wherein X is H or alkyl, Y is a divalent alkylene group, Q is O, S or NR, R is H or alkyl, and Z is alkyl, and n is 0 or 1.

The present invention further relates to a method of processing thermoplastic material to form a plastic article, wherein the method comprises the step of processing the thermoplastic material at a temperature greater than the melt temperature of the thermoplastic, wherein the thermoplastic material comprises polymer and at least one polychromic substance as defined above; and further comprising the step of irradiating the plastic article to color at least a region of the plastic article.

18 Claims, No Drawings

THERMOPLASTIC MATERIAL COMPRISING POLYCHROMIC SUBSTANCES

CROSS REFERENCE TO RELATED APPLICATIONS

This application is a continuation of U.S. patent application Ser. No. 12/357,671, filed Jan. 22, 2009 now U.S. Pat. No. 7,897,320.

FIELD OF THE INVENTION

The present invention relates to thermoplastic materials comprising polymer and at least one polychromic substance. The present invention further relates to methods of processing thermoplastic material comprising polymer and the polychromic substance, at elevated temperatures, above the melt temperature of the thermoplastic material, to form plastic articles such as containers, especially packaging containers such as bottles and closures.

BACKGROUND OF THE INVENTION

Thermoplastic material, and finished plastic articles, containing these polychromic substances can be made to change colour upon irradiation with, for example, ultraviolet and/or infra-red radiation.

Compounds based upon diacetylene, X—C≡C—C≡C—Y, when polymerized, are known to take on different colour properties. Polymerisation is typically achieved by exposure to certain types of radiation, such as ultraviolet radiation. Differing the intensity of the radiation causes differing degrees of polymerization, and different colours.

It is known that these properties can be utilized to achieve multi-colour printing. See, for example: U.S. Pat. No. 4,705,742, "Processless multicolour imaging", issued on Nov. 10th 1987, assigned to Gaf Corporation; and WO2006/018640, "Multi-colour printing", published on Feb. 23rd 2006, Sherwood Technologies Ltd. Both of these documents disclose methods of applying coatings comprising various diacetylene compounds to the surface of a substrate for the purpose of irradiating and forming an image on the surface of the substrate.

It would, however, be desirable to disperse diacetylene compounds in a thermoplastic material, and then forming finished plastic articles by, for example, blow moulding, injection moulding, extruding. One advantage of achieving such plastic articles would be in the packaging of goods, such as consumer goods, in containers such that any data, colour coding and the like can be inscribed into a bottle or closure late in the packing process, at or even after the packing line. This avoids the need for feeding numerous different bottles and/or closures to a packing line for product change-overs, thus reducing packaging inventory and improving packing efficiency.

However, a problem exists in that diacetylene compounds, such as 10,12-pentacosadiynoic acid, are readily degraded at the processing temperatures which are above the melt temperature of commonly used thermoplastic resins. Such processing temperatures are required for blow moulding, injection moulding, extruding, and the like. In addition, such diacetylene compounds have poor compatibility with, and do not blend into, polyolefins.

The present invention is based upon the finding that certain functional modifications to the diacetylene-based molecule greatly improve its thermal resistance at elevated processing conditions, improve its compatibility with the polymer (e.g. the polyolefin), and improve its compatibility in the finished article. This makes it possible to realize the advantages set out above.

SUMMARY OF THE INVENTION

The present invention relates to thermoplastic material comprising polymer and at least one polychromic substance, wherein the polychromic substance is a functionalised diacetylene having the formula which has the general structure:

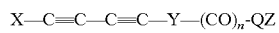

X—C≡C—C≡C—Y—(CO)$_n$-QZ wherein X is H or alkyl, Y is a divalent alkylene group, Q is O, S or NR, R is H or alkyl, and Z is alkyl, and n is 0 or 1. The present invention further relates to a method of processing thermoplastic material to form a plastic article, wherein the method comprises the step of processing the thermoplastic material at a temperature greater than the melt temperature, $T_m$, of the thermoplastic, wherein the thermoplastic material comprises polymer and at least one polychromic substance as defined above; and further comprising the step of irradiating the plastic article to colour at least a region of the plastic article.

DETAILED DESCRIPTION OF THE INVENTION

Polychromic substances according to the present invention are diacetylene compounds of the type that will undergo a colour change upon irradiation, and which have the general structure:

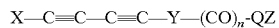

X—C≡C—C≡C—Y—(CO)$_n$-QZ wherein X is H or alkyl, Y is a divalent alkylene group, Q is O, S or NR, R is H or alkyl, and Z is alkyl, and n is 0 or 1.

It will be appreciated that polychromic substances of the invention are ethers, thioethers, amides or derivatives of carboxylic acids. Each alkyl or alkylene group typically includes up to 20 or more carbon atoms, and may be cyclic or acyclic, saturated or unsaturated, aliphatic or aromatic. It may be preferred that an alkyl group, e.g. the group R and/or Z includes unsaturation. Further, the group Z may include a further diacetylene structure, such that the compound is a dimer. X or Z may be substituted, e.g. X is substituted with (CO)$_n$-QZ, so that the compound is difunctional.

The presence of the group Z has the effect of increasing compatibility with thermoplastics. This can enhance processability and resistance to phase separation/migration. If Z includes an unsaturated, e.g. C═C or C≡C, bond, this can undergo cross-linking and/or polymerization, thus locking the chain in the state that is coloured.

The carboxylic acids from which the compounds of the invention are derived include compounds that are known or can readily be prepared by one of ordinary skill in the art. A particularly preferred example of such an acid is PDA and its carboxylic acid derivatives including esters, thioesters and amides.

The diacetylene compound may comprise other functional groups known in organic chemistry such as alcohol, amino, carbonyl such as aldehyde or ketone, carboxylic acid or carboxylic acid derivative, ether, halogeno, alkene, alkyne, nitro, nitrile or any type of aliphatic or aromatic ring and the like. Preferred examples are alcohol group derivatives such as ethers. Particularly preferred examples are carboxylic acid derivative groups such as esters, thioesters, anhydrides and amides.

Starting diacetylene compounds which include carboxylic acid groups are preferred as they can be easily converted into carbonyl chloride groups by reaction with a chlorinating agent such as oxalyl chloride or thionyl chloride and the like. The carbonyl chloride intermediate compound can then react with nucleophilic species such as alcohols, thiols, amines or carboxylate groups to yield the desired ester, thioester, amide or anhydride diacetylene compounds. The resultant ester, thioester, amide or anhydride group diacetylene compounds can be mono-functionalized by reacting the carbonyl chloride group with a co-reactant molecule comprising just one nucleophilic group or the co-reactant molecule can comprise at least two nucleophilic groups to produce a desired compound that comprises more than one diacetylene moiety. Particularly preferred are amines which react to give rise to amides. Any primary amine, secondary amine or tertiary amines is suitable. The amine can comprise one nucleophilic nitrogen such as 1-aminobutane or propargylamine, or at least two nucleophilic nitrogen groups such as ethylene diamine or 1,12-diaminododecane.

More particularly preferred are the carboxylic acid derivatives of 10,12-pentacosadiynoic acid such as esters, thioesters, anhydrides and amides. More particularly preferred still are amide derivatives comprising the —CONR— group, where R is H or any group comprising at least one carbon atom. These can be produced by reacting 10,12-pentacosadiynoic acid with a chlorinating agent which converts the carboxylic acid group into a carbonyl chloride followed by reaction with an amine.

Other diacetylene compounds that can be used, to form compounds for use in the present invention include, but are not limited to: 5,7-docosadiyndioic acid, 5,7-dodecadiynoic acid, 4,6-dodecadiynoic acid, 5,7-eicosadiynoic acid, 5,7-eicosadiyn-1-ol, 6,8-heneicosadiynoic acid, 8,10-heneicosadiynoic acid, 12,14-heptacosadiynoic acid, 2,4-heptadecadiynoic acid, 4,6-heptadecadiynoic acid, 2,4-heptadecadiyn-1-ol, 5,7-hexadecadiynoic acid, 2,10,12-heneicosaadiynoic acid, 10,12-heptacosadiynoic acid, 10,12-docosadiyndioic acid, 10,12-octadecadiynoic acid, 10,12-pentacosadiynoic acid, 10,12-tricosadiynoic acid, 2,4-hexadiyne-1,6-diol, 1,6-bis-(4-methoxy-phenyl)-1,6-diphenyl-hexa-2,4-diyne-1,6-diol, 1,1,1,8,8,8-hexaphenyl-octa-3,5-diyne-2,7-diol, 1,1,6,6-tetrakis-(3-methoxy-phenyl)-hexa-2,4-diyne-1,6-diol, 1,1,6,6-tetrakis-biphenyl-4-yl-hexa-2,4-diyne-1,6-diol, 1,1,6,6-tetraphenyl-hexa-2,4-diyne-1,6-diol, 10,12-pentacosadiyn-ol and derivatives thereof.

Preferred compounds possess at least one alcohol derivative group such as ether. More preferred compounds possess at least one carboxylic acid derivative group such as ester, thioester, amide or anhydride. A specifically preferred acid is 10,12-pentacosadiynoic acid and its carboxylic acid derivatives such as esters, thioesters, anhydrides and amides of 10,12-pentacosadiynoic acid are particularly preferred.

Some specific examples of polychromic substances according to the invention are shown below:

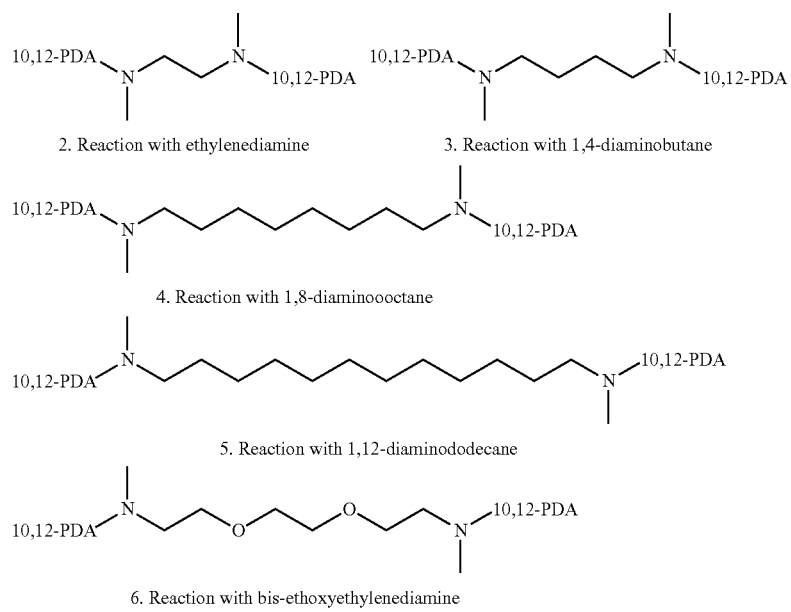

2. Reaction with ethylenediamine
3. Reaction with 1,4-diaminobutane
4. Reaction with 1,8-diaminoooctane
5. Reaction with 1,12-diaminododecane
6. Reaction with bis-ethoxyethylenediamine 10,12-PDA-NH—CH$_2$CH$_3$
7. Reaction with ethylamine
10,12-PDA-NH—CH$_2$(CH$_2$)$_6$CH$_3$
8. Reaction with ocylamine
10,12-PDA-NH—CH$_2$—≡
9. Reaction with propargylamine The diacetylene compound can be non-ionic, zwitterionic, cationic or anionic.

Particularly preferred compounds are those that are initially colourless or of low visual colour, and become coloured upon irradiation. More preferred are those that are initially colourless or of low visual colour, and become coloured upon irradiation and will then change to a colour, different to the first, upon further irradiation with the same or different type of radiation.

Any type of radiation which performs the colour change reactions can be used. This includes laser or non-coherent, broadband or monochromatic radiation. Specific radiation types include ultraviolet, near, mid or far infrared, visible, microwave, gamma-ray, x-ray or electron beam.

Particularly preferred are those examples that change from colourless or low visual colour to coloured on exposure to ultraviolet irradiation, and then change to a colour different to the first on subsequent exposure to infrared irradiation.

Laser irradiation is preferred for writing text and drawing artwork directly on thermoplastic material comprising the compounds of the present invention, as laser imaging can be conveniently controlled by computer with the appropriate software. However similar effects can also be obtained by passing radiation through a mask before it reaches the thermoplastic material comprising the compounds of the present invention.

The polychromic substances of the present invention can be used singularly or in admixture with other types of compound that will undergo colour change reactions on irradiation. Preferred examples of other types of compound that undergo colour change reactions on irradiation are those that fall in the charge transfer category. These are compound that are colourless or of low colour when neutral but develop colour when they acquire a charge. Typically, these compounds are nitrogen comprising bases that when protonated form coloured compounds. Preferred examples being amines and carbazoles. These compounds are often used in combination with an acid generating species which can be either thermally or photolytically initiated or both. Suitable examples include those taught in WO2006/051309.

Further preferred examples of other types of compound that undergo colour change reactions on irradiation are 'leuco dyes'. Suitable leuco dyes are described in "Dyestuffs and Chemicals for Carbonless Copy Paper" presented at Coating Conference (1983, San Francisco, Calif. pp 157-165) by Dyestuffs and Chemicals Division of Ciba-Geigy Corp Greenboro, N.C. Leuco dyes are understood to be colourless in neutral or alkaline media, but become coloured when they react with an acidic or electron accepting substance. Suitable examples include compounds such as triphenylmethanephthalide compounds, azaphthalide compounds, isoindolide phthalide compounds, vinylphthalide compounds, spiropyran compounds, rhodamine lactam compounds, lactone and dilactone compounds, benzoyl leuco methylene blue (BLMB), derivatives of bis-(p-di-alkylaminoaryl)methane, xanthenes, indolyls, auramines, chromenoindol compounds, pyrollo-pyrrole compounds, fluorene compounds, and fluoran and bisfluoran compounds, with fluoran compounds being preferred. Particularly preferred commercial leuco dye products include the Pergascript range by Ciba Speciality Chemicals, Basel, Switzerland and those by Yamada Chemical Co. Ltd, Kyoto, Japan. Others include those made by Nisso Chemical Co GmbH a subsidiary of Nippon Soda Co. Ltd. Tokyo, Japan. These compounds are often used in combination with an acid generating species which can be either thermally or photolytically initiated or both. Particularly preferred acid generating species are those that are heat stable and act via a photolytic mechanism. A preferred example of an acid generating agent is triarylsulphonium hexafluorophosphate salts mixed in propylene carbonate.

The polychromic substance of the present in invention is mixed with a polymer to form a thermoplastic material. The thermoplastic material can further comprise any other additives known to those skilled in the art such as binders, pigments, dyes, resins, lubricants, solubilizers, particulate matter, fluorescers, and the like. Particularly preferred are opacifying agents such as titanium dioxide, pearlescent pigments and fluorescent agents. Radiation absorbers can also be used. Exposure of the thermoplastic material comprising the diacetylene compounds of the present invention to irradiation will bring about a colour change reaction which can be used to create text, artwork, devices or other images and effects.

Examples of the thermoplastic materials into which the polychromic materials of the present invention can be incorporated are: Acrylonitrile butadiene styrene (ABS), Acrylic, Celluloid, Cellulose acetate, Ethylene-Vinyl Acetate (EVA), Ethylene vinyl alcohol (EVAL), Fluoroplastics (PTFEs, including FEP, PFA, CTFE, ECTFE, ETFE), Ionomers, Kydex, a trademarked acrylic/PVC alloy, Liquid Crystal Polymer (LCP), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polyethylene terephthalate (PET), Polycyclohexylene dimethylene terephthalate (PCT), Polycarbonate (PC), Polyhydroxyalkanoates (PHAs), Polyketone (PK), Polyester, Polyethylene (PE) including low density (LDPE) and high density (HDPE) versions, Polyetheretherketone (PEEK), Polyetherimide (PEI), Polyethersulfone (PES)—see Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polypropylene (PP), Polystyrene (PS), Polysulfone (PSU), Polyvinyl chloride (PVC), Polyvinylidene chloride (PVDC), Spectralon. Most preferred are polyolefins, and in particular polyethylene, polyethylene terephthalate, polypropylene, or mixtures thereof.

Preferably, the thermoplastic material of the present invention comprises: from 90% to 99.99% by weight of the polymer; from 0.01% to 10% by weight of the polychromic substance; and optionally other additives (such as those additives described herein).

The polychromic substance and/or other substances of the present invention can be incorporated into the thermoplastic material using a solid or liquid masterbatch process. Suitable examples of these are supplied by Americhem Inc of Cuyahoga Falls, Ohio, USA, Hampton Colours of Stroud, UK, Riverdale Color of Perth Amboy, N.J., USA and ColorMatrix of Berea, Ohio, USA.

Thermoplastic materials may be formed into complex forms by various processes, notably moulding processes, extrusion processes, etc. In these processes the thermoplastic material is typically heated to a temperature above its melt temperature, $T_m$, so that the thermoplastic material can be formed into the desired shape. Preferred processing temperatures are between about 100° C. and 500° C. In moulding processes a mould which generally comprises two or more parts is provided, which can be closed to form a mould cavity. In injection moulding processes the thermoplastic material is injected into the mould cavity. In blow moulding processes a heated preform or parison is placed within the mould and air is injected into the preform or parison so that it expands within the mould cavity to form a hollow body. In extrusion processes the heated thermoplastic material is forced under pressure through an extrusion die. Many variations on these basic processes are practiced in industry, such as, for example, injection stretch blow moulding, extrusion blow moulding.

The color-activatible thermoplastic resin can be used to make packages and articles of various forms such as produced by the non-limiting examples of: blow molding, extrusion blow molding, injection blow molding, stretch blow molding, injection stretch blow molding, injection molding, injection molding of preforms, overmolding, multi-layer injection molding, extrusion, plastic extrusion, sheet extrusion, film extrusion, coat-extrusion, overjacket extrusion, co-extrusion, compression molding, and thermoforming.

In one preferred process the thermoplastic material is first formed into fibres, for example by extrusion processes (commonly referred to as "spinning"). Spun fibres may be used to make cloth-like sheets of non-woven fibres, or by weaving, knitting, etc. Such woven or non-woven sheets comprising thermoplastic material as defined herein are "plastic articles"

according to the present invention, and they can be further treated by the step of irradiating the sheet to colour at least a region of the sheet. In this way various effects including text, artwork, devices or other images and effects such as stripes, speckles can be achieved on woven or non-woven sheets.

In one particularly preferred process, co-extrusion is used to form an article from two or more thermoplastics. Using a co-extrusion process enables the polychromic substance to be incorporated into only one of the co-extruded layers, or into more than one, but not all of the co-extruded layers. This enables the method of the present invention to be achieved using less polychromic substance than would be necessary if the polychromic substance would be uniformly distributed throughout an single layer of the thermoplastic material, thus offering the opportunity of saving cost.

These processes are useful for the production of packaging and packaging elements which may be primary packaging, secondary packaging, and/or additional packaging. Exemplary packaging embodiments include plastic boxes, bags, pouches, cans, bottles, tottles, jars, thermoform blisters, clamshells, and combinations thereof. Primary packaging includes any container, including its closure, pump, cap, spout, handle, lid, cover, plastic film windows. Secondary packaging includes any additional materials that are associated with the primary packaging, such as, for example, a container such as a box or polymeric sleeve or wrapping/covering that at least partially surrounds, contains, or contacts the primary packaging. The color-activatible composition can also take the form of a label or other package element that can be affixed to the consumer product itself, advertisement material pertaining to the consumer product, and/or packaging of the consumer product. These packaging elements, comprising the diacetylene compounds of the present invention, are particularly suitable for use with fast moving consumer goods, such as home and personal care products, as any data can be inscribed on to the container or closure very late down stream. This compounds of the present invention can also yield multi-colours without the need for multi-component mixtures and the user can choose which colour they desired merely by controlling the irradiation. Exposure of the part comprising the diacetylene compounds of the present invention to irradiation will bring about a colour change reaction which can be used to create text, artwork, devices or other images and effects such as stripes, speckles. Alternatively, or additionally, the diacetylene compounds may be selectively distributed, rather than homogeneously distributed, within the thermoplastic material in order to achieve the desired effects.

Surface effects can be used to compliment or enhance the colour effects generated by the present invention. Part or all of the surface of the coloured article can be embossed, roughened, contoured, for example.

The thermoplastic comprising the polychromic substances and/or other substances of the present invention can further comprise other additives known to those skilled in the art of thermoplastic processing. Particularly preferred are opacifying agents such as titanium dioxide, pearlescent pigments and fluorescent agents, and radiation absorbers such as UV and NIR absorbers. Other additives include reheat agents, slip additives, antioxidants, light and heat stabilizers, metal deactivators, PVC stabilizers, plasticizers, lubricants, PVC processing aids, impact modifiers, flame retardants, antistatic agents, fluorescent whitening agents, biostabilizers, antimicrobials, chemical blowing agents, organic peroxides nucleating agents, anti acetaldehyde agents, oxygen barriers, carbon dioxide barriers, process aids, stabilizers and HALS.

The following Examples 1, 2 and 6 to 17 illustrate the invention.

EXAMPLES

Reference Example 1

Mono-Amide Diacetylene Compound 1

10,12-Pentacosadiynoic acid (ex. GFS Chemicals, 8.0 g) was dissolved in dichloromethane (150 ml) under a nitrogen atmosphere. To this solution oxalyl chloride (ex. Aldrich, 6.0 g) was added followed by the addition of 10 drops of DMF. The reaction mixture was then stirred at 20° C. for 4 hours.

Propargylamine (ex. GFS Chemicals, 1.27 g) dissolved in 10% aqueous sodium hydroxide solution (50 g) was added to the 10,12-pentacosadiynoic acid chloride reaction mixture over 10 minutes. The reaction mixture was then left stirring for 30 minutes at 20° C. The reaction mixture was then left to phase separate overnight. The lower DCM phase was then removed and placed in a freezer overnight. The result precipitate was collected using vacuum filtration and dried in an oven at 40° C.

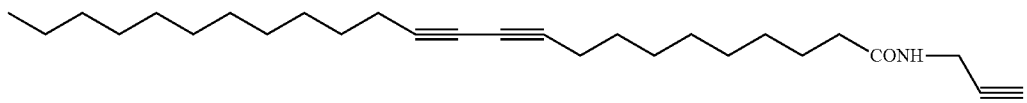

Reference Example 2

Bis-Amide Diacetylene Compound 2

10,12-Pentacosadiynoic acid (ex. GFS Chemicals, 8.0 g) was dissolved in dichloromethane (150 ml) under a nitrogen atmosphere. To this solution oxalyl chloride (ex. Aldrich, 6.0 g) was added followed by the addition of 10 drops of DMF. The reaction mixture was then stirred at 20° C. for 4 hours.

1,8-Diaminooctane (ex. GFS Chemicals, 1.58 g) dissolved in 10% aqueous sodium hydroxide solution (50 g) was added to the 10,12-pentacosadiynoic acid chloride reaction mixture over 10 minutes. The reaction mixture was then left stirring for 30 minutes at 20° C. The resultant precipitate was collected by vacuum filtration and dried in an oven at 40° C.

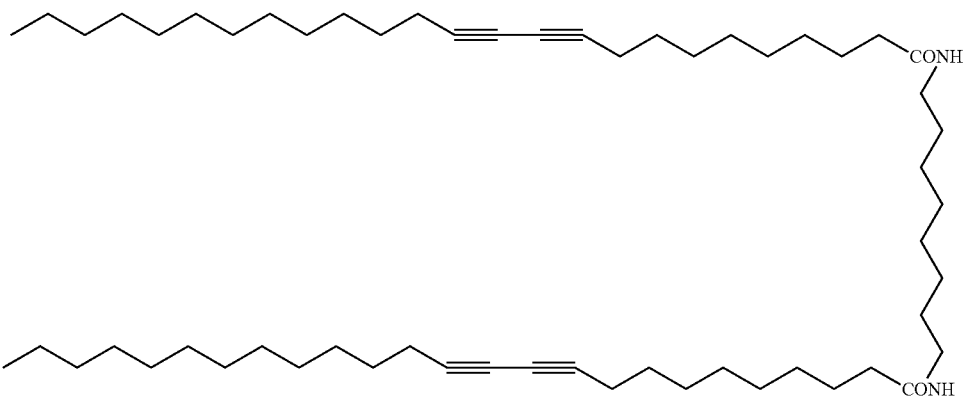

Example 3

Application of Compound 1 to a Substrate Using a Surface Coating Technique

An ink was formulated comprising:

| | | |
|---|---|---|
| (i) | Compound 1 | 5 g |
| (ii) | A 15% solution of Elvacite 2028 (ex. Lucite International, a low molecular weight methacrylate copolymer) in MEK | 95 g. |

The ink formulation was milled for 10 minutes using a 50 ml Eiger-Torrance bead mill.

The ink was drawn down on to photocopy paper and HiFi 50 micron white PET film to give a coatweight of approximately 3 to 6 gsm.

Both coated substrates were initially white and turn blue on exposure to broadband ultraviolet radiation supplied by a Jenten UV curing machine. Further exposure of the coated substrate to infrared radiation using a Bosch heat gun resulted in the blue changing to a magenta, then red, then orange and then a yellow colour.

A 266 nm, 3 W UV laser linked to an IBM compatible PC was used to write text and draw artwork and devices on the coated substrate. These images could be produced in one colour or multi-coloured depending upon the fluence applied.

Example 4

Application of Compound 2 to a Substrate Using a Surface Coating Technique

An ink was formulated comprising:

| | | |
|---|---|---|
| (i) | Compound 2 | 5 g |
| (ii) | A 15% solution of Elvacite 2028 (ex. Lucite International, a low molecular weight methacrylate copolymer) in MEK | 95 g. |

The ink formulation was milled for 10 minutes using a 50 ml Eiger-Torrance bead mill.

The ink was drawn down on to photocopy paper and HiFi 50 micron white PET film to give a coatweight of approximately 3 to 6 gsm.

Both coated substrates were initially white and turned blue on exposure to broadband ultraviolet radiation supplied by a Jenten UV curing machine. Further exposure of the coated substrate to infrared radiation using a Bosch heat gun resulted in the blue changing to a magenta, then red.

A 266 nm, 3 W UV laser linked to an IBM compatible PC was used to write text and draw artwork and devices on the coated substrate.

Example 5

Application of 10,12-Pentacosadiynoic Acid to a Thermoplastic Using an Injection Moulding Process 10,12-Pentacosadiynoic acid was mixed with Borealis HG 385 MO polypropylene (150 g). The mixture was then injection moulded using an injection moulding machine set to a barrel temperature of 220° C.

The resultant part, a closure, was initially colourless and a very pale blue on exposure to broadband ultraviolet radiation supplied by a Jenten UV curing machine. Further exposure of the closure to infrared radiation using a Bosch heat gun resulted in the very pale blue changing to a very pale red.

A 266 nm, 3 W UV laser linked to an IBM compatible PC was used to write very pale text and draw very pale artwork and devices on the closure.

Example 6

Application of Compound 1 to a Thermoplastic Using an Injection Moulding Process Compound 1 (1.5 g) was mixed with Borealis HG 385 MO polypropylene (150 g). The mixture was then injection moulded using an injection moulding machine set to a barrel temperature of 220° C.

The resultant part, a closure, was initially colourless and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

A 266 nm, 3 W UV laser linked to an IBM compatible PC was used to write text and draw artwork and devices on the closure.

The colours obtained with compound 1 were much deeper than those obtained with the same amount of 10,12-pentacosadiynoic acid.

Example 7

Application of Compound 1 to a Thermoplastic Using an Injection Moulding Process with Titanium Dioxide

As example 6 but with the addition of titanium dioxide (1%).

The resultant closure was initially white and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

A 266 nm, 3 W UV laser linked to an IBM compatible PC was used to write text and draw artwork and devices on the closure.

Example 8

Application of Compound 1 to a Thermoplastic Using an Extrusion Blow Moulding Process

Compound 1 (1.5 g) was mixed with Hastalen ACP5831 D polyethylene (150 g). The mixture was then extrusion blow moulded using an extrusion blow moulding machine set to 190° C.

The resultant part, a bottle container, was initially colourless and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

A 266 nm, 3 W UV laser linked to an IBM compatible PC was used to write text and draw artwork and devices on the bottle.

Example 9

Application of Compound 1 to a Thermoplastic Using an Extrusion Blow Moulding Process with Titanium Dioxide

As example 6 but with the addition of titanium dioxide (1%).

The resultant bottle was initially white and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

A 266 nm, 3 W UV laser linked to an IBM compatible PC was used to write text and draw artwork and devices on the closure.

Example 10

Application of Compound 2 to a Thermoplastic Using an Injection Moulding Process

Compound 2 (1.5 g) was mixed with Borealis HG 385 MO polypropylene (150 g). The mixture was then injection moulded using an injection moulding machine set to a barrel temperature of 220° C.

The resultant part, a closure, was initially colourless and turned blue on exposure to broadband ultraviolet radiation supplied by a Jenten UV curing machine. Further exposure of the closure to infrared radiation using a Bosch heat gun resulted in the blue changing to a magenta, then red.

A 266 nm, 3 W UV laser linked to an IBM compatible PC was used to write text and draw artwork and devices on the closure.

The colours obtained with compound 2 were much deeper than those obtained with the same amount of 10,12-PDA.

Example 11

Application of Compound 2 to a Thermoplastic Using an Injection Moulding Process with Titanium Dioxide

As example 10 but with the addition of titanium dioxide (1%).

The resultant closure was initially white and turned blue on exposure to broadband ultraviolet radiation supplied by a Jenten UV curing machine. Further exposure of the closure to infrared radiation using a Bosch heat gun resulted in the blue changing to a magenta, then red.

A 266 nm, 3 W UV laser linked to an IBM compatible PC was used to write text and draw artwork and devices on the closure.

Example 12a

Application of Compound 1 to a Thermoplastic Using an Injection Moulding Process

Compound 1 (1.5 g) was mixed with Borealis HG 385 MO polypropylene (150 g). The mixture was then injection moulded using an injection moulding machine set to a barrel temperature of 220° C.

The resultant part, a bottle preform, was initially colourless and turned blue on exposure to broadband ultraviolet radiation supplied by a Jenten UV curing machine. Further exposure of the preform to infrared radiation using a Bosch heat gun resulted in the blue changing to a magenta, then red followed by orange and yellow.

A 266 nm, 3 W UV laser linked to an IBM compatible PC was used to write text and draw artwork and devices on the preform.

Example 12b

Stretch Blow Moulding of the Preforms Prepared in Example 12a into Bottles

The polypropylene preforms prepared in example 12a were stretch blow moulded into bottles. This was performed with both uncoloured and coloured preforms. In either case uncoloured areas of the results bottles were turned blue on exposure to broadband ultraviolet radiation supplied by a Jenten UV curing machine. Further exposure of the bottle to infrared radiation using a Bosch heat gun resulted in the blue changing to a magenta, then red.

A 266 nm, 3 W UV laser linked to an IBM compatible PC was used to write text and draw artwork and devices on the bottle.

Example 13a

Application of Compound 2 to a Thermoplastic Using an Injection Moulding Process

Compound 2 (1.5 g) was mixed with Borealis HG 385 MO polypropylene (150 g). The mixture was then injection moulded using an injection moulding machine set to a barrel temperature of 220° C.

The resultant part, a bottle preform, was initially colourless and turned blue on exposure to broadband ultraviolet radiation supplied by a Jenten UV curing machine. Further exposure of the preform to infrared radiation using a Bosch heat gun resulted in the blue changing to a magenta, then red followed by orange and yellow.

A 266 nm, 3 W UV laser linked to an IBM compatible PC was used to write text and draw artwork and devices on the preform.

Example 13b

Stretch Blow Moulding of the Preforms Prepared in Example 13a into Bottles

The polypropylene preforms prepared in example 13a were stretch blow moulded into bottles. This was performed with both uncoloured and coloured preforms. In either case uncoloured areas of the results bottles were turned blue on exposure to broadband ultraviolet radiation supplied by a Jenten UV curing machine. Further exposure of the bottle to infrared radiation using a Bosch heat gun resulted in the blue changing to a magenta, then red.

A 266 nm, 3 W UV laser linked to an IBM compatible PC was used to write text and draw artwork and devices on the bottle.

Example 14a

Application of Compound 2 to a Thermoplastic Using an Injection Moulding Process Compound 2 (1.5 g) was mixed with Melinar B60 polyester (150 g). The mixture was then injection moulded using an injection moulding machine set to a barrel temperature of 280° C. The resultant part, a bottle preform, was initially colourless and turned blue on exposure to broadband ultraviolet radiation supplied by a Jenten UV curing machine. Further exposure of the preform to infrared radiation using a Bosch heat gun resulted in the blue changing to a magenta, then red followed by orange and yellow.

A 266 nm, 3 W UV laser linked to an IBM compatible PC was used to write text and draw artwork and devices on the preform.

Example 14b

Stretch Blow Moulding of the Preforms Prepared in Example 14a into Bottles

The polyester preforms prepared in example 14a were stretch blow moulded into bottles. This was performed with both uncoloured and coloured preforms. In either case uncoloured areas of the results bottles were turned blue on exposure to broadband ultraviolet radiation supplied by a Jenten UV curing machine. Further exposure of the bottle to infrared radiation using a Bosch heat gun resulted in the blue changing to a magenta, then red.

A 266 nm, 3 W UV laser linked to an IBM compatible PC was used to write text and draw artwork and devices on the bottle.

Example 15

Application of Compound 1 to a Thermoplastic Using an Injection Moulding Process in Combination with Charge Transfer Agents Compound 1 (1.5 g) was mixed with Hastalen ACP5831 D polyethylene (150 g), together with N-ethyl carbazole (1.5 g) triphenylamine (0.5 g) and triarylsulphonium hexafluorophosphate salts (50%) mixed in propylene carbonate (2.0 g).

The mixture was then injection moulded using an injection moulding machine set to a barrel temperature of 190° C.

The resultant part, a closure, was initially colourless and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

On prolonged exposure to broadband UV radiation the colourless areas turned initially blue and then green. Heating the colourless closure with a heat gun and then exposing the hot closure to broadband UV radiation resulted in the formation of a green colour.

A 266 nm, 3 W UV laser linked to an IBM compatible PC was used to write text and draw artwork and devices on the closure.

Example 16

Application of Compound 1 to a Thermoplastic Using an Injection Moulding Process in Combination with a Leuco Dye Compound 1 (1.5 g) was mixed with Hastalen ACP5831 D polyethylene (150 g), together with Yamada Yellow Y726 (0.75 g) and triarylsulphonium hexafluorophosphate salts (50%) mixed in propylene carbonate (1.5 g).

The mixture was then injection moulded using an injection moulding machine set to a barrel temperature of 190° C.

The resultant part, a closure, was initially colourless and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

On prolonged exposure to broadband UV radiation the colourless areas turned initially blue and then green. Heating the colourless closure with a heat gun and then exposing the hot closure to broadband UV radiation resulted in the formation of a yellow colour.

A 266 nm, 3 W UV laser linked to an IBM compatible PC was used to write text and draw artwork and devices on the closure.

Example 17

Application of Compound 2 to a Thermoplastic Using an Injection Moulding Process in Combination with a Leuco Dye Compound 2 (1.5 g) was mixed with Hastalen ACP5831 D polyethylene (150 g), together with Yamada Yellow Y726 (0.5 g) and Pergacript Blue SRB (0.5 g) and triarylsulphonium hexafluorophosphate salts (50%) mixed in propylene carbonate (2.0 g).

The mixture was then injection moulded using an injection moulding machine set to a barrel temperature of 190° C.

The resultant part, a closure, was initially colourless and turned blue on exposure to broadband ultraviolet radiation supplied by a Jenten UV curing machine. Further exposure of the closure to infrared radiation using a Bosch heat gun resulted in the blue changing to a magenta, then red followed by orange and yellow.

On prolonged exposure to broadband UV radiation the colourless areas turned initially blue and then green. Heating the colourless closure with a heat gun and then exposing the hot closure to broadband UV radiation resulted in the formation of a green colour.

A 266 nm, 3 W UV laser linked to an IBM compatible PC was used to write text and draw artwork and devices on the closure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition of the same term in a document incorporated by reference, the meaning of definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A thermoplastic material comprising a polymer and a least one polychromic substance, wherein the at least one polychromic substance is a functionalised diacetylene having the formula which has the general structure:

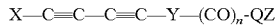

wherein X is Y—(CO)$_n$-QZ; Y is a divalent alkylene group; Q is O, S or NR; R is H or alkyl; Z is H or alkyl; and n is 0 or 1; and wherein the thermoplastic material comprises from about 90% to about 99.9% by weight of the polymer and from about 0.01% to about 10% by weight of the polymeric substance.

2. The thermoplastic material of claim 1, wherein the polymer is a polyolefin selected from the group consisting of polyethylene, polyethylene terephthalate, polypropylene, and mixtures thereof.

3. The thermoplastic material of claim 1, further comprising a pigment or opacifying agent.

4. A method of processing a thermoplastic material to form a plastic article or component thereof, wherein the method comprises the steps of:
   a. providing a thermoplastic blend comprising a polymer and a diactylene-based polychromic material, wherein the thermoplastic blend comprises from about 90% to about 99.9% by weight of the polymer and from about 0.01% to about 10% by weight of the diacetylene-based polychromic material;
   b. heating the thermoplastic blend to a temperature greater than or equal to the melt temperature of the polymer; and
   c. extruding the thermoplastic blend to form the plastic article or component thereof.

5. The method of claim 4, wherein the polymer is a polyolefin selected from the group consisting of polyethylene, polyethylene terephthalate, polypropylene, and mixtures thereof.

6. The method of claim 4, wherein the diacetylene-based polychromic material is a functionalised diactylene compound.

7. The method of claim 4, wherein the diacetylene-based polychromic material has the general structure:

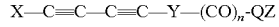

wherein X is Y—(CO)$_n$-QZ; Y is a divalent alkylene group; Q is O, S or NR; R is H or alkyl; Z is H or alkyl; and n is 0 or 1.

8. The method of claim 4, further comprising the step of irradiating the plastic article or component thereof to change the colour in at least one region of the plastic article or component thereof.

9. The method of claim 4, wherein the plastic article is a container.

10. The method of claim 4, wherein the plastic article is packaging material.

11. The method of claim 4, wherein the plastic article is a woven or nonwoven material.

12. A method of processing thermoplastic to form a plastic article, wherein the method comprises the steps of:
   a. extruding a first thermoplastic material to form a first portion of the plastic article, the first thermoplastic material comprising a first polymer and a polychromic substance comprising a functionalised diacetylene having the formula which as the general structure:

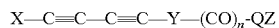

wherein X is H, alkyl, or Y—(CO)$_n$-QZ; Y is a divalent alkylene group; Q is O, S or NR; R is H or alkyl; Z is H or alkyl; and n is 0 or 1; and wherein the thermoplastic material comprises from about 90% to about 99.9% by weight of the polymer and from about 0.01% to about 10% by weight of the polymeric substance; and
   b. extruding a second thermoplastic material to form a second portion of the plastic article, the second thermoplastic material comprising a second polymer and being devoid of a polychromic substance;
   c. wherein the first portion and the second portion of the plastic article are bonded together via at least one of steps (a) and (b).

13. A plastic article comprising:
   a. a polymer and a least one polychromic substance, wherein the at least one polychromic substance is a functionalised diacetylene having the formula which as the general structure:

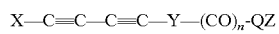

wherein X is H, alkyl, or Y—(CO)$_n$-QZ; Y is a divalent alkylene group; Q is O, S or NR; R is H or alkyl; Z is H or alkyl; and n is 0 or 1; and wherein the thermoplastic material comprises from about 90% to about 99.9% by weight of the polymer and from about 0.01% to about 10% by weight of the polymeric substance;
   b. a first region of a first colour; and
   c. a second region of a second colour that is different from the first colour.

14. The plastic article of claim 13, wherein the plastic article is a container.

15. The plastic article of claim 13, wherein the plastic article is packaging material.

16. The plastic article of claim 13, wherein the plastic article is a woven or nonwoven material.

17. The plastic article of claim 13, wherein the second colour forms text, artwork, or an image.

18. The plastic article of claim 13, further comprising a surface effect proximate the second region.

* * * * *